(No Model.)
W. R. WILCOX.
SLEIGH BRAKE.
No. 396,844. Patented Jan. 29, 1889.
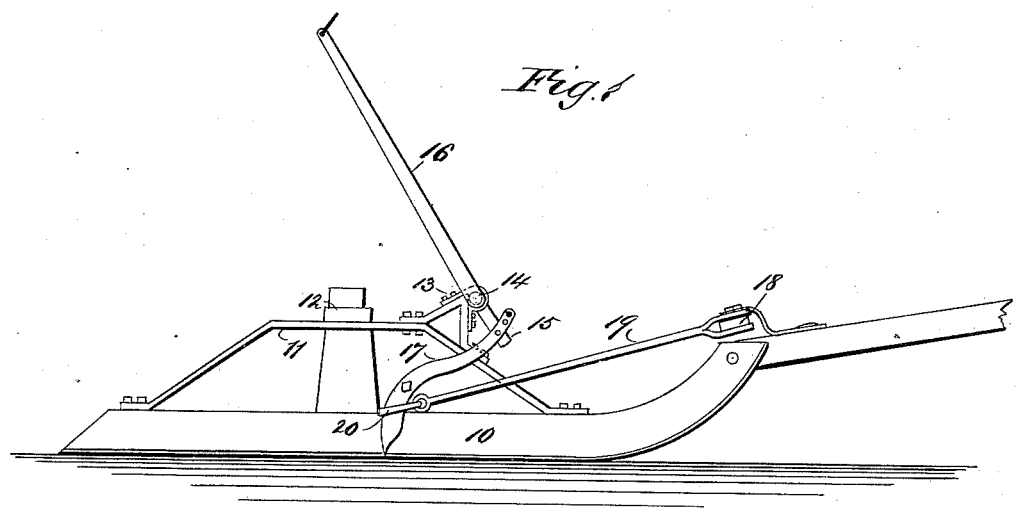
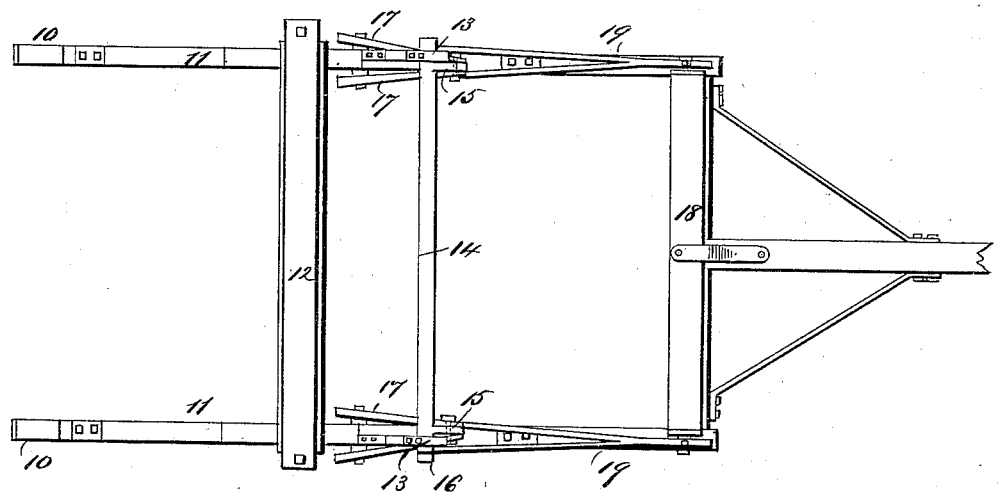
WITNESSES:
INVENTOR:
W. R. Wilcox
BY Munn & Co
ATTORNEYS.

UNITED STATES PATENT OFFICE.

WILLIAM R. WILCOX, OF PORTLAND, COLORADO.

SLEIGH-BRAKE.

SPECIFICATION forming part of Letters Patent No. 396,844, dated January 29, 1889.

Application filed November 1, 1888. Serial No. 289,697. (No model.)

*To all whom it may concern:*

Be it known that I, WILLIAM R. WILCOX, of Portland, in the county of Ouray and State of Colorado, have invented a new and Improved Sleigh-Brake, of which the following is a full, clear, and exact description.

My invention relates to an improvement in sleigh-brakes, and has for its object to provide a brake of simple and durable construction and capable of convenient manipulation; and a further object of the invention is to provide a very light brake and one which will yield when an obstruction is encountered and return to its gripping position without communicating to the operator any disagreeable strain or sudden shock.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both views.

Figure 1 is a side elevation of the device applied to a single bob-sleigh, and Fig. 2 is a plan view of the same.

In carrying out the invention I have illustrated the same as attached to a single bob-sleigh; but the device may be applied to a double bob or other form of sleigh.

To each of the runners 10 a rave, 11, is secured in any approved manner, upon which raves the usual cross-timbers, 12, are supported. A bracket, 13, is rigidly fastened to each rave, the said brackets being made to extend upward and forward from the front side of the raves at or near the top, as best shown in Fig. 1. In the brackets 13 a transverse shaft, 14, is journaled, and between the brackets at each end an arm, 15, is forwardly projected, and at one extremity of the shaft a lever, 16, is secured, which lever is preferably extended upward and rearward, as best shown in Fig. 1.

To each side of the shaft-arms 15 the upper ends of downwardly-curved ice-hooks 17 are pivoted, which hooks curving downward pass one upon the inside and the other upon the outside of each runner, as best shown in Fig. 2.

The opposing ice-hooks at each side of the sleigh are preferably connected by a bolt located above the runners when the hooks are in contact with the snow or ice.

In order that the hooks when applied to the surface may yield to an obstruction and not jar or strain the driver when bearing upon the lever, an evener, 18, is centrally pivoted at or near the forward end of the sleigh, preferably to a bracket secured to the tongue.

A rod, 19, is pivoted to each end of the evener, the rear extremities of which rods are forked, and the members of the said forked ends are pivotally connected by a link, 20, or equivalent device, with the several ice-hooks, one bar being united with two hooks comprising a set.

In the event that two bob-sleighs are used, the brake is preferably attached to the rear sleigh only.

In operation, the brakes are put on or taken off by throwing the shaft-lever either forward or back with the foot or hand. When thrown forward, the brakes are applied and the lever may be held in this position by the driver. By reason of the pivotal connection between the two sets of ice-hooks it is evident that if the set upon one side of the sleigh should come in contact with an obstruction the set upon the other side will be thrown forward, permitting the other set to move to the rear. The evener also prevents any sudden shock or strain from being communicated to the driver while holding the brake-lever down.

Having thus described my invention, I claim as new and desire to secure by Letters Patent—

1. The combination, with a sleigh, a shaft journaled transversely of the same, provided with forwardly-extending arms, and a lever attached to one extremity of said shaft, of downwardly-curved ice-hooks pivoted one at each side of the said shaft-arms, an evener pivoted to the body of the sleigh, and rods connecting the ends of the said evener with each set of ice-hooks, substantially as shown and described.

2. The combination, with the runners of a sleigh, a rave attached to each runner, a shaft journaled upon the said raves, provided with forwardly-extending arms, and a lever secured to one extremity of the said shaft, of downwardly-curved ice-hooks pivoted one at each side of the said shaft-arms, an evener pivoted upon the body of the sleigh, links attached at the lower ends of the said ice-hooks, and a bifurcated rod pivoted to each end of the evener and connected with each set of ice-hooks, substantially as and for the purpose specified.

WILLIAM R. WILCOX.

Witnesses:
W. A. SHERMAN,
W. E. BLOCK.